United States Patent
Andersson et al.

[11] Patent Number: 5,809,129
[45] Date of Patent: Sep. 15, 1998

[54] RESOURCE SEPARATION IN A CALL AND CONNECTION SEPARATED NETWORK

[75] Inventors: Erik Staffan Andersson, Enskede; Nils Bertil Nilsson, Huddinge, both of Sweden

[73] Assignee: Telefonaktiebolaget LM Ericsson, Stockholm, Sweden

[21] Appl. No.: 527,012

[22] Filed: Sep. 12, 1995

[30] Foreign Application Priority Data

Sep. 12, 1994 [SE] Sweden .................................. 9403035

[51] Int. Cl.⁶ .................................................. H04M 7/00
[52] U.S. Cl. ........................... 379/220; 379/207; 379/219
[58] Field of Search .................................. 379/219, 220, 379/221, 207, 201, 111, 112, 113, 133, 134, 137, 138, 139; 395/51, 908, 909

[56] References Cited

U.S. PATENT DOCUMENTS

| | | | |
|---|---|---|---|
| 4,348,554 | 9/1982 | Asmuth . | |
| 4,713,806 | 12/1987 | Oberlander et al. . | |
| 4,961,224 | 10/1990 | Yung . | |
| 5,086,460 | 2/1992 | Ash et al. . | |
| 5,164,938 | 11/1992 | Jurkevich et al. . | |
| 5,175,800 | 12/1992 | Galis et al. ................ | 395/51 |
| 5,359,649 | 10/1994 | Rosu et al. ................ | 379/220 |
| 5,406,620 | 4/1995 | Pei ............................ | 379/219 |

FOREIGN PATENT DOCUMENTS

| | | |
|---|---|---|
| 564 215 | 10/1993 | European Pat. Off. . |
| WO94/14264 | 6/1994 | WIPO . |

*Primary Examiner*—Ahmad F. Matar
*Assistant Examiner*—Scott Wolinsky
*Attorney, Agent, or Firm*—Burns, Doane, Swecker & Mathis, L.L.P.

[57] ABSTRACT

In a call and connection separated network, a method of providing distribution of resources of a physical network among different logical networks which are using the physical network for establishing connections. All of the physical resources of the physical network are mapped onto a single logical network description that will comprise nodes, trunk groups interconnecting the nodes, and resource pools. The different logical networks are created by routing tables located at each of the nodes. The routing tables are provided with a fixed maximum percentage figure relating to the maximum amount by which an individual logical network is allowed to use a common resource thus distributing the resources between the different logical networks. By assigning an individual maximum percentage figure to each of the logical networks and in so doing observing the sum of the maximum percentages for all logical networks, it is possible to create complete resource separation of the resource or competition for the resource among the logical networks.

10 Claims, 8 Drawing Sheets

RESOURCE SEPARATION IN A CALL AND CONNECTION SEPARATED NETWORK

BACKGROUND OF THE INVENTION

This invention relates to telecommunication networks and more particularly to separation of resources in a call and connection separated network.

Examples of resources are time slots grouped in a trunk group or means grouped in one or more pools containing such means.

A call and connection separated network is a logical abstraction of a physical network. The physical network comprises switches, such as switches of a central office, links, that comprise transmission resources, connecting said switches, various auxiliary devices such as voice prompting devices, echo cancelers, tone signalling devices. Further there are access points to the physical network. To the access points access units such as telephone sets and terminals, can be connected to the physical network. A call and connection separated network comprises a call layer and a connection layer. At the call layer there is an end-to-end connection between two subscribers or users that want to set up a connection therebetween. At the connection layer the call is established through the various switches along a route between the subscribers engaged in a conversation or between users, such as two computers, engaged in a session. The connection layer offers bearer services for setting up connections. Examples of bearer services are STM 64 (synchronous transmission mode with standard 64 kbit/s), STM 2 Mb (synchronous transmission mode with 2 Mbit/s), ATM (asynchronous transmission mode) and other bearer services. At the call layer there are one or more service networks that request the use of an individual bearer service for connection establishment. Examples of service networks are POTS (plain old telephony service), ISDN (integrated services digital network), GSM (a digital mobile telephony service) and computer networks.

A service network also referred to as an application, sends a request to the connection layer requesting that a connection should be set up, using a particular bearer, between two terminating points in a logical network, said logical network belonging to the connection layer and forming a logical view of the physical network. The logical network is used to route the connection through the physical network. The logical network is configured by the network operator. Logical networks will be discussed in detail below.

Example of links are fiber optic conductors, cables, radio links and other transmission media.

In FIG. 1 there is shown an example of a simple physical network comprising three switches 1, 2, 3 interconnected with routes 4 and 5. Each route represents the total resources of the network between the two switches. As an example route 4 comprises two 2 Mbit/s links between switches 1 and 2 and route 5 comprises one 2 Mbit/s link between switches 2 and 3. Each of the 2 Mbit/s links comprises 32 64 kbit/s channels. The bearer service is in this example STM 64. Accordingly there are 64 channels between 1 and 2, and 32 channels between switches 2 and 3, each such channel thus having a bit rate of 64 kbit/s. Telephone sets 6, 7 and 8 are connected to each switch 1, 2, and 3 respectively. Intelligent terminals 9, 10, 11 are connected to switches 1, 2 and 3 respectively. It should be understood that many more telephone sets, terminals as well as other facilities are connected to each switch than those shown in FIG. 1. The telephone sets are using the POTS service network SN1 while the intelligent terminals are using an ISDN service network SN2.

At the connection layer two logical networks LN1 and LN2 are shown. Each logical network comprises a view of the physical network, in particular logical network LN1 comprises one view and logical network LN2 comprises another view different from that of logical network LN1. As example logical network LN1 is owned or rented by a first company that has premises in two different cities; switch 1 being situated in a first city and switch 2 being situated in the second city. Logical network LN2 is owned or rented by another company having premises in two cities, the first city being the same one as that in which switch 1 is situated and the second city being still another city in which switch 3 is situated. A logical representation of a switch is commonly referred to as a fabric or node. Logical network LN1 comprises fabrics F1 and F2 and logical network LN2 comprises fabrics F3, F4 and F5. Logical network LN1 further comprises trunk groups 17 and 18 and logical network LN2 further comprises trunk groups 19, 20, 21 and 22. To each fabric F1–F5 there is associated a routing table. In particular routing table 12 is associated with fabric Fl, routing table 13 with F2, 14 with F3, 15 with F4 and 16 with F5. The routing tables are used to route a connection from fabric to fabric between the termination points in which the users engaged in a conversation are located.

Each logical network has its own logical representation of its resources, i.e. fabrics and trunk groups, although the logical networks are using the same physical infrastructure. This implies that the resources of the two logical networks are completely separated and so are the logical networks.

Trunk groups 17 and 18 represent each 64 kbit/s resources appearing in route 4, trunk group 17 being the end of route 4 at switch 1 and trunk group 18 being the other end of the same route at switch 2. A similar situation holds true for trunk groups 19 and 20 representing route 4 in LN2 and trunk groups 21, 22 representing route 5 in LN2.

To each switch telephone sets and terminals are connected, but since these items belong to the service networks they do not appear in the logical networks. For connection establishment the access points of the telephone sets and of the terminals in the service nets must be mapped to corresponding termination points in the logical networks in order to make said access points in the service networks known to the logical networks.

The company served by logical network LN1 may have subscribed on 32 64 kbit/s connections while the company served by logical network LN2 also may have subscribed to 32 64 kbit/s connections. In particular this means that of the 64 channels offered by route 4 32 are taken by LN1 and 32 by LN2. LN1 and LN2 thus shares route 4. However, no one of the 32 channels allocated to LN1 can be taken by LN2. Similarly no one of the 32 channels subscribed to by LN2 can be taken by LN1. The resource that comprises the 64 channels of route 4 are accordingly completely separated between LN1 and LN2. If for some reason one of the two 2 Mbit/s links goes down all of its 32 64 kbit/s channels will go down. Suppose they all are allocated to logical network LN1. In this case no connections can be set up between switch 1 and switch 2. The traffic will continue on the intact 2 Mbit/s link between switches 1 and 2 and accordingly the traffic between switches 1 and 3 in the logical network LN2 will not be disturbed. Even if some of the 32 channels used by LN2 between switches 1 and 2 are not used for traffic such free channels can not be used by LN1 because they have been configured to belong to LN2. This is a drawback which emanates from the way the logical networks are configured.

Another drawback with the existing way of configuring logical networks over a physical network concerns the administration, that is the handling and maintenance of the logical network descriptions. One network description is required for each logical network. Since a physical switch, for example, may appear in several logical networks it must therefore have several different logical representations. A similar situation relates to trunk groups. From administrative point of view this way of configuring the logical networks requires much work.

At the call layer each service network contains functionality that handles signalling between two or more parties/users that want to communicate. By way of example subscriber A wants to make a call to subscriber B using service network SN1 which in this case is POTS. When subscriber A goes off-hook and dials the telephone number to B POTS checks if B is busy or not. At the call layer the routing of a corresponding connection request goes from the access point of A directly to the access point of B. At the call layer the internal structure of the physical network is hidden, that is the internal physical structure is not seen by a service network. From the service network a connection request is sent down to the connection layer, said request pointing out the logical network to be used, in this particular case LN1. This is indicated by the arrow 24. As appears from FIG. 1 logical network LN1 is a sub-set of the physical network. In FIG. 1 the second service network SN2, for example ISDN, sends a similar connection request, indicated by arrow 25 to its logical network LN2. In the illustrated case terminal C wants to communicate with terminal D. It should be observed that subscriber A cannot communicate with terminal C since they do not belong to the same logical network. As is apparent from FIG. 1, however, route 4 is part of logical networks LN1 and LN2 and this link resource is accordingly split or separated between service networks SN1 and SN2.

In the example referred to above each of the logical networks LN1 and LN2 disposes of 32 64 kbit/s channels. Suppose both networks each want to dispose over 50 channels. To realize this it is possible to configure the networks in such a manner that 50 channels are allotted to each of the networks LN1 and LN2. The channels which LN1 and LN2 will have in common will be subjected to competition from LN1 and from LN2. If logical network LN1 has seized one of said common channels it cannot be used by LN2. Accordingly congestion may arise in LN2.

Configuration of Logical Networks

Seen from the point of the physical network, that is at the physical layer, it does not matter to the physical network which kind of units that are connected to its switches and links. The physical network is only concerned of its actual resources such as links and switches, time slots on each link, resources connected to its links but not to the access units to the physical network. In a similar way the logical networks at the connection layer do not care about which service network they are serving. Suppose there is just the three switches 1–3 and the routes 4, 5. In this situation no traffic can be run on the physical network. Next the access terminals 6–11 are added. Still no traffic can be run on the physical network. Next the logical networks are configured over the physical network and its associated objects and the routing tables are set up. The routing tables are local to each fabric and indicate the trunk group which should be used for a given destination, said destination being any one of the users belonging to the individual logical network. Now, traffic can start when a call request is received by the logical network as configured in the described manner. This procedure of providing a separate network description for each logical network is time consuming and the set up and administration of the network descriptions is time consuming.

RELATED KNOWN TECHNIQUE

U.S. Pat. No. 5,164,938 relates to an information transmitting system for the transmission of various types of traffic such as data signals, video signals and audio signals, in composite frames. Each traffic type is allocated an individual priority. The priority information is stored in an attribute associated with the traffic type. Traffic of one type may seize bandwidth from traffic of another type in the composite frames during periods of congestion in the network. In this way resources in the form of bandwidth is distributed among the different traffic types.

In the U.S. Pat. Ser. No. 5,164,938 the composite data frames of are of a fixed size. The composite data frames are reconfigured in order to achieve optimum bandwidth utilization, traffic flow and throughput performance. Bandwidth is selectively sized from one or more traffic component types and the seized bandwidth is redistributed to one or more traffic component types having a greater priority for the bandwidth. In the patent a table (TABLE IV) is shown relating to bandwidth allocation. Each traffic component slot (referred to as T-slot) is associated with a respective minimum guaranteed bandwidth, maximum allowable bandwidth and call block threshold (link utilization threshold).

The patent does not disclose how a link is selected or what happens if there is congestion on a selected link. The patent does not disclose any methods or means for allowing a T-slot to expand its bandwidth based on the figures given in said table.

In contrast the invention in accordance with the present application clearly indicates that resource allocation is based upon a comparison of a fixed percentage figure with a running percentage figure and that this comparison shall take place in connection with routing analyses. In particular routing analyses will point out a trunk group to be used for the call. A trunk table associated with the pointed out trunk group contains information used for deciding on the seizure of a channel in the pointed out trunk group. The only items that need to be amended in connection with reconfiguration and expansion are the percent figures appearing in the routing tables.

U.S. Pat. Ser. No. 4,713,806 relates to multiservice digital network separated into a program controlled call processing system and a resource management system program-independent of the call processing system. A proxy vendor call processing method is described that gives subscribers fast response to broadcast services. The network responds to the subscribers' broadcast service requests on behalf of—as a proxy of—the broadcast service vendors.

There are no means described that separates the resources of a trunk between different digital networks. Neither is there disclosed any mechanism which makes it possible to uphold traffic on a trunk, shared by two or more networks, when one or more of the links of the shared trunk goes down.

U.S. Pat. No. 5,086,460 describes a method to enhance the reliability of a telecommunication service from a local switching office, a private branch exchange, a computer terminal or overseas international switching centers by arranging each such unit so that it "homes in" (is connected to) two nodes of the telecommunication network. Long distance traffic from a unit is supplied to any of the two nodes on a proportional basis, e.g. 50—50. Other methods of selecting the paths to the two nodes may be used. Each call is given a routing treatment at the unit. As an example, three different types of treatments are defined. The level of traffic (expressed as percentage figures) that should be assigned each one of said three treatments is given in a routing treatment table. The sum of the percentages should equal 100 percent. Accordingly the traffic is divided into three types of treatments.

U.S. Pat. Ser. No. 4,348,554 relates to a method for providing a private network without having to provide private hardware facilities. The private network uses the transmission facilities of the public network. The private network is defined by tables stored in a data base. The tables define among other things virtual trunk groups associated with the private network. In said tables there is a slot containing the total number of virtual trunks in a group and another slot containing a running count of the total number of virtual trunks assigned to calls. Still another slot contains an indicator which specifies the action to be taken in the event a call is blocked because of the lack of trunks in a virtual group. The patent does not address the question of distributing resources among several private networks. If the public network changes, for example is expanded, then each public networks' tables must be changed too. This is in contrast to the present invention; if the logical networks are to be changed then only one table, the routing table, needs to be changed.

WO 94/14264 relates to a method for congestion management in a frame relay network. Four different congestion levels, labelled 0, 1, 2, 3, are defined. Depending on the amount by which an input buffer memory is filled the congestion level is increased. The more the input buffer memory is filled the higher will be the congestion level. Frames are grouped according to their (data link connection identifier). Each DLCI-group has its individual service class. The service class of an incoming frame is compared to the current congestion level and depending on its service class the frame is discarded or not. In this manner frames having a low service class will be discarded allowing frames of higher service classes to be transferred through the network.

EP-A2-0 564 215 relates to a digital private network signalling system (DPNSS) comprising a link between two switching nodes. The link comprises a number of circuits grouped into trunk groups. Trunk access class (TAC) is a code used to differentiate different classes of traffic. In the switching nodes a route restriction table is used to define to which trunk group access is allowed or barred by TAC. This means that bandwidth (or trunks) in the DPNSS link can be allocated by class of traffic. The route restriction table may be altered from time to time to vary the allocation of bandwidth between classes of traffic in the DPNSS link.

Accordingly classes of traffic are separated between trunks. There are no means described that separates the resources of a trunk between two or more different DPNSS systems. Neither is there disclosed any mechanism which makes it possible to uphold traffic, fair to the different services, on the trunk when one or more of the links of the trunk in the DPNSS goes down.

SUMMARY OF THE INVENTION

In accordance with the invention all physical resources of a telecommunication network are mapped on a single network description. The single network description is referred to as a flat structure. Based on the single network description one or more logical networks are defined.

The single network description gives a total view of the complete physical network. If the physical network changes, for example expands by the addition of new exchanges and new trunks, corresponding amendments need be performed once only, namely in the single network description. This is in contrast to the prior art described in connection with FIG. 1 where several network descriptions need to be amended in order to reflect the changes made to the physical network.

The use of a flat structure will also facilitate maintenance and administration of the physical network.

Several logical networks share a resource, for example a trunk group or a pool of a specific resource, common to the logical networks. The present invention provides means and methods for dividing said resource between logical networks in a manner so as to guarantee each logical network admission to a predefined amount of said common resource. The means used for achieving this comprises a fixed percentage figure relating to the maximum amount by which an individual logical network may occupy the common resource and a running percentage figure relating to the amount by which an individual logical network indeed is occupying the resource.

The method used to allow an individual logical network to seize/engage a resource, in accordance with the invention is to compare the fixed percentage figure with the running percentage figure. If the former is larger than the later the resource is seized, otherwise not.

The running percentage figure is stored in a resource table—a trunk group table or a resource pool table—common to the logical networks and the fixed percentage figure is preferably stored in a routing table.

Further to guarantee each logical network admission to a predefined amount of said common resource the present invention (i) either provides complete separation, also referred to as segregation, of the common resource between the logical networks or (ii) allows the logical networks to compete for a predefined amount of the common resource.

Whether complete resource separation or competition should prevail is controlled by a later to described formula that relates to the sum of the fixed percentage figures of the logical networks.

If the invention applied to a switched circuit network it will accordingly be possible to achieve complete resource separation between logical networks. This is a novel feature. Traditionally the logical networks contend for a common resource.

A trunk group may comprise several links. A link is a physical device. If a link of a trunk group that is shared among several logical networks goes down, the traffic in the corresponding logical networks will not go down, but will all be affected to the same extent.

BRIEF DESCRIPTION OF THE DRAWINGS

The novel features believed characteristic of the invention are set forth in the appended claims. The invention itself, however, as well as other features and advantages thereof, will be best understood by reference to the detailed description of the specific embodiments which follows, when read in conjunction with the accompanying drawings, wherein;

DETAILED DESCRIPTION OF SPECIFIC EMBODIMENT

Figure 1:
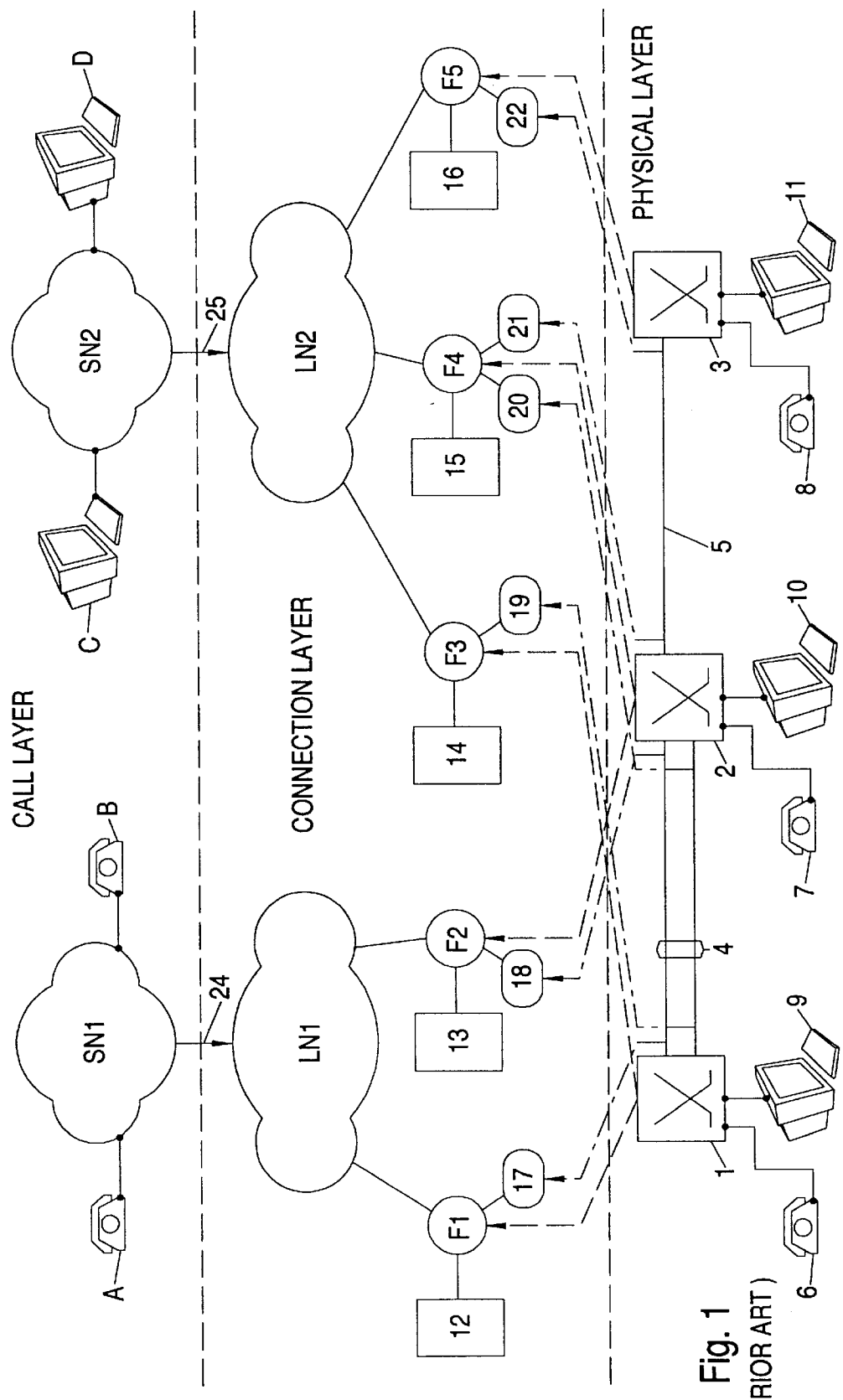
FIG. 1 is a simplified schematic view, partly in block form, of a call and connection separated telecommunication network configured in accordance with prior art methods.
Figure 2:
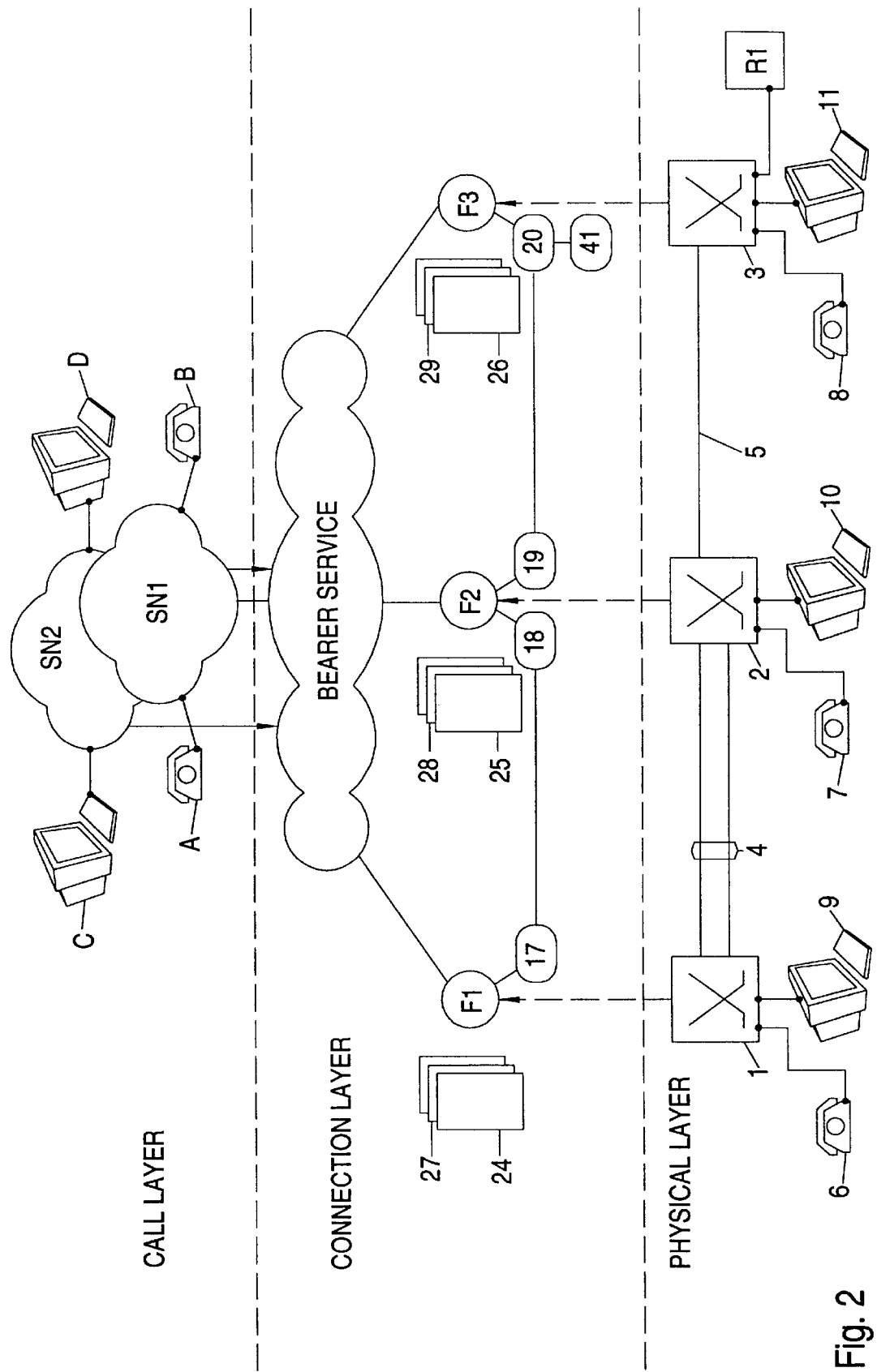
FIG. 2 is a simplified schematic block diagram showing a call and connection separated telecommunication network configured in accordance with the present invention.

FIG. 2 is a block diagram similar to FIG. 1 showing the design of the telecommunication network 1-5 which is identical to that of FIG. 1, at the connection layer. In accordance with the invention only one logical representation of each of the resources at the physical layer is done. Accordingly only one switch fabric F1 is created for the physical switch 1, only one switch fabric F2 is created for the physical switch 2 and only one fabric F3 created for switch 3. Similarly there is connected to each fabric only one trunk group per destination. Each trunk group comprises all resources of its adjacent switch. It is possible to use this information model since there is a 1-to-1 correspondence between a physical facility and its logical representation. In accordance with the invention the logical networks LN1, LN2 of FIG. 1 are created by routing tables. In particular there is one routing table per fabric and logical network. Routing tables 24, 25, 26 do all belong to one and the same logical network such as for example LN1. Routing tables 27, 28, 29 do all belong to one and the same logical network LN2. If there are more logical networks, one additional set of routing tables per each additional logical network is created; each additional set comprising as many tables as there are nodes in the logical representation of the physical network. Accordingly, only one single network description is required. This is in contrast to the prior art according to which there are as many network descriptions as there are logical networks. The logical representation in accordance with the invention comprises only one network description. Only one network description needs to be amended if the physical network is amended. Since there is just one trunk group between two nodes and since there are many logical networks (defined by the routing tables) there is a totally open competition between the logical networks for the resources.

By just one logical representation of the physical telecommunication network is present it is possible to let it represent an individual bearer service which can be used by many service networks. Accordingly, the network operator need not care about which are the service networks that will use the bearer service. Still a network operator can offer its customers several bearer services that use one and the same physical network. To accomplish this the network operator needs to create one network description for each bearer service.

Each one of the routing tables 24–29 is associated with a respective logical network. Each routing table has several entries, each one corresponding to the destination addresses of a local exchanges to which a called party is connected, and will give as output data the trunk group to be used for routing the desired connection to the next fabric along the way to the end destination.

In accordance with the most preferred embodiment of the invention each routing table 24–29 further comprises information relating to the maximum degree of occupancy, in particular expressed in terms of a maximum percentage, by which an individual logical network is allowed to use the resources in the trunk group. Said information, in particular said percentage figure, is transmitted to the trunk group, such as for an example trunk group 17, when a request for the establishment of a connection is sent to the trunk group. In this manner the trunk group is provided with information it utilizes in order to keep track of how many percents of its total resource, for example expressed in terms of number of channels, each logical network has seized. In this manner it is possible to achieve either a totally open competition between the logical networks for an individual resource or to achieve a predefined distribution of a resource among the individual logical networks.

If a link goes down all logical networks will be affected to the same extent and a situation referred to above in connection with FIG. 1 will not occur.

Figure 3:
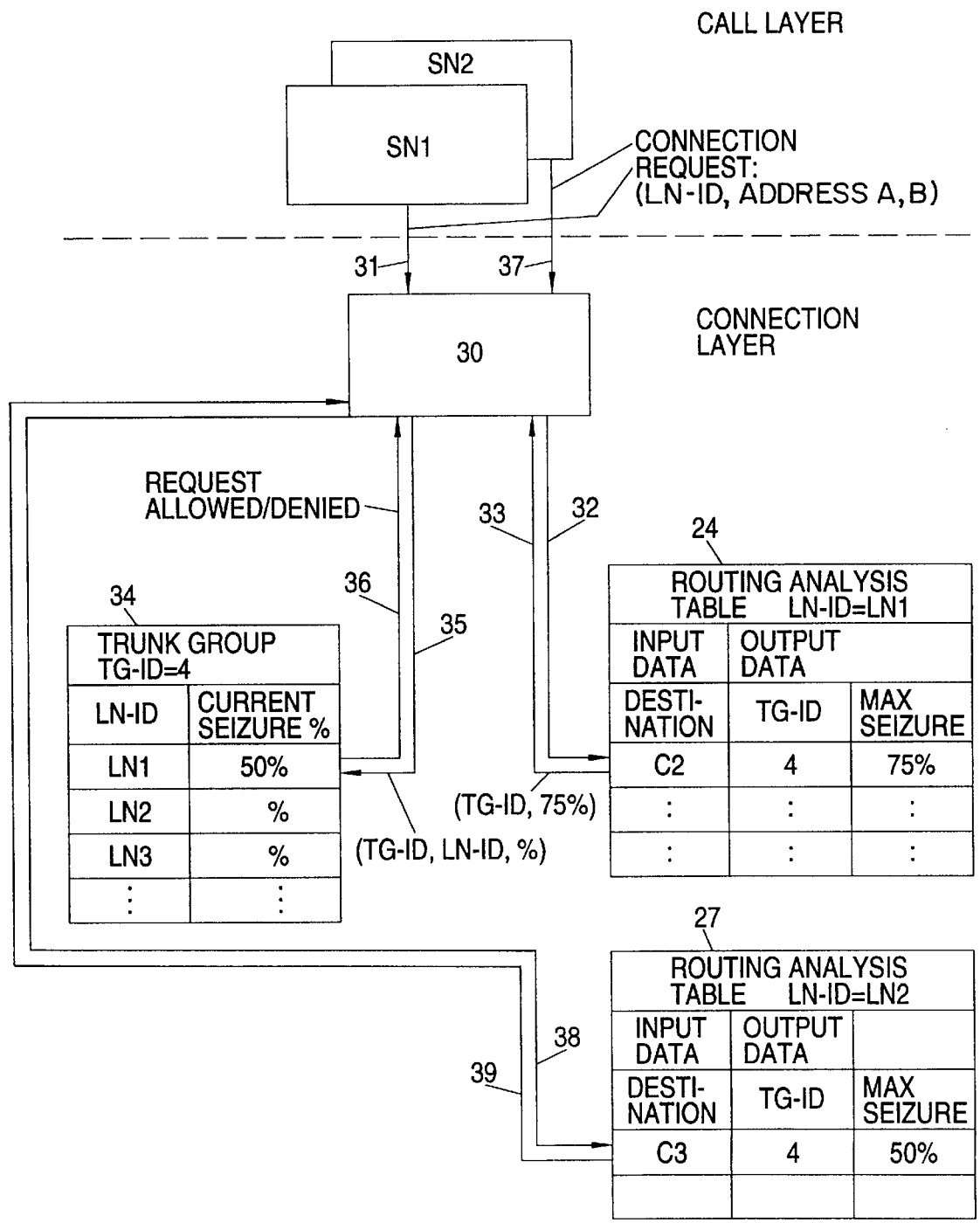
FIG. 3 is a combined flow diagram and block diagram showing an implementation of a configuration method and a resource allocation method in accordance with the invention.

FIG. 3 is partly a block diagram and partly a flow diagram showing the layout of routing tables 24 and 27 and what will happen when a connection request is sent from an application at the call layer to a bearer service at the connection layer. FIG. 3 refers to FIG. 2 and it is assumed that routes 4 and 5 are the same as those described in connection with FIG. 1. In particular there are two 2 Mbit/s links between switch 1 and switch 2 and one 2 Mbit/s links between switch 2 and switch 3.

The bearer service is STM 64. Accordingly,64 channels are available between switch 1 and switch 2 and 32 channels are available between switch 2 and switch 3. For the sake of convenience it is assumed that switch 1 is situated in city C1, switch 2 in city C2 and switch 3 in city C3. Looking at fabric F1 the network operator generates a trunk group 17 which for the sake of convenience will be given the trunk group identity 4 (TG-ID=4) since it refers to route 4. With this trunk group identity 4 there will be associated resources in the form of 64 kbit/s channels, in this particular case 64 such channels. For traffic that originates from city C1 and as destination has either city C2 or city C3 the same trunk group identity, TG-ID=4, should be used along the path from city C1 to city C2. This is entered in the routing tables 24 and 27 in the TG-ID column at the corresponding destination entries. In this particular case there is a logical network LN1 that has subscribers connected to the node in city C1 and the node in city C2. There is also a logical network LN2 that has subscribers in city C1 and city C3. The two logical networks will request a certain capacity of the operator in charge of the logical networks LN1 and LN2. It is assumed that logical network LN1 wants to have at least 32 (=50%) 64 kbit/s channels and at most 48 (=75%) channels available. This implies that the network operator can offer logical network LN2 to have at least 16 (=25%) channels available and at most 32 (=50%) channels available. This in turn means that there will be a competition for 16 channels between the two networks LN1 and LN2. Each logical network will, however, have a guarantee for a minimum service level. These Figures of 75% and 50% respectively are entered at the indicated entries in routing tables 24 and 27 respectively when the network operator configures the physical network.

By way of example; should it be desired to have a totally open competition for the 64 channels between LN1 and LN2 then the figure of 100% should be entered in the corresponding entries in the two routing tables 24, 27.

The maximum percentage figure, referred to as the fixed percentage figure in the introductory portion of the specification and referred to as maximum seizure in the drawings, plays an important role when a common resource shall be divided among a number of logical networks. This is demonstrated by the following example wherein there are three network operators A, B and C; operator A operating logical network LN1, operator B operating logical LN2 and operator C operating logical network LN3. A wants his network LN1 to use at maximum 70% of a trunk, operator B wants his network LN2 to use at maximum 40% of the same trunk and operator C wants his network to use at maximum 30% of same trunk. This is indicated in the following table.

TABLE 1

| Logical network | Maximum percentage figure |
| --- | --- |
| LN1 | 70% |
| LN2 | 40% |
| LN3 | 30% |

Logical network LN1 will be guaranteed an amount equal to 100% minus the sum of the maximum percentage figures of the rest of the logical networks. Logical network LN1 will thus be guaranteed 100% −(40%+30%), that is 30% of the total resource. Logical network LN2 will be guaranteed 100%−(70%+30%) which equals 0. Accordingly LN2 will not be guaranteed any resource at all. Logical network LN3 will be guaranteed 100%−(70%+40%) which equals minus 10%. Accordingly LN3 too will not be guaranteed any resources. Logical network LN2 will, however, have a better service level than LN3.

If the sum of the maximum percentage figures equals 100%, then the there is a complete resource separation of the resource among the networks. A resource owned by one logical network cannot be seized by another logical network.

If the sum of the maximum percentages exceeds 100% then the logical networks compete for the resource and a logical network cannot be guaranteed it can seize the resource to the amount defined by its respective maximum percent figure.

When service network SN1 requests a bearer service from the logical network at node F1 a software package 30 in this node receives a connection request comprising logical network identity (=LN-ID), origin (=address A) as well as destination (=address B). The software package 30, run on a processor not shown, (i) searches its routing tables, (ii) finds the routing table associated with logical network LN1 and fabric 1 and (iii) finds, at entry C2, the city in which the local exchange of subscriber B is located, trunk group ID=4 as output result. Further to this the output result also comprises a percent figure, 75% in this example, indicating the amount by which this logical network LN1 at maximum may take from the resources of said trunk group. The connection request at logical network LN1 is labelled 31, the search for the corresponding entry in the routing table is represented by arrow 32, the result from the search is represented by arrow 33. Next the software package 30 uses this output data and searches for the corresponding trunk group, in this particular case the trunk group the identity, TG-ID, of which equals 4. This trunk group having TG-ID=4 is shown at 34. Next the software package 30 sends a request to the trunk group 34, said request being represented by arrow 35. Next the software package 30 checks the identified trunk group to examine (a) if there are any channels free and (b) if the number of channels that currently used by logical network LN1 is less than the fixed percent figure, in this case 75%. If conditions (a) and (b) are true, a channel is seized and the percent figure is updated. In the indicated example the percentage figure is supposed to be 50% upon occurrence of the request and will altered into 52% when the requested channel has been occupied. If any of conditions (a) and (b) or if both (a) and (b) is/are false the request is denied. Arrow 36 indicates whether the request is allowed or denied.

A similar procedure will be repeated when there is connection request from service network 2 requesting a connection between subscribers C and D. Such connection request is represented by arrow 37. The software package 30 searches for the routing table corresponding to LN2, said search being represented by arrow 38 and the output result, trunk group identity TG-ID, and maximum occupancy figure is reported to the software package, arrow 39, which then searches for the trunk group the identity TG-ID of which equals 4. The trunk group that has TG-ID=4 is found and the current percentage figure for logical network LN2 is checked and is updated if there are any free channels.

Instead of having one routing table per fabric and logical network in accordance with FIG. 3 it is possible to use one single routing table per fabric and provide said single routing table with a logical network identifier, LN-ID, which identifies the particular logical network. Such a single routing table is shown at 40 in FIG. 4. The routing table 40 will accordingly replace the two routing tables 24 and 27 in FIG. 2. The routing table 40 comprises an additional input data column labelled LN-ID, logical network identifier. Since a connection request from a logical network comprises, further to the destination of requested connection, the identity of the logical network, the software package 30 will have no problem in finding the corresponding routing table entry.

Figure 5:
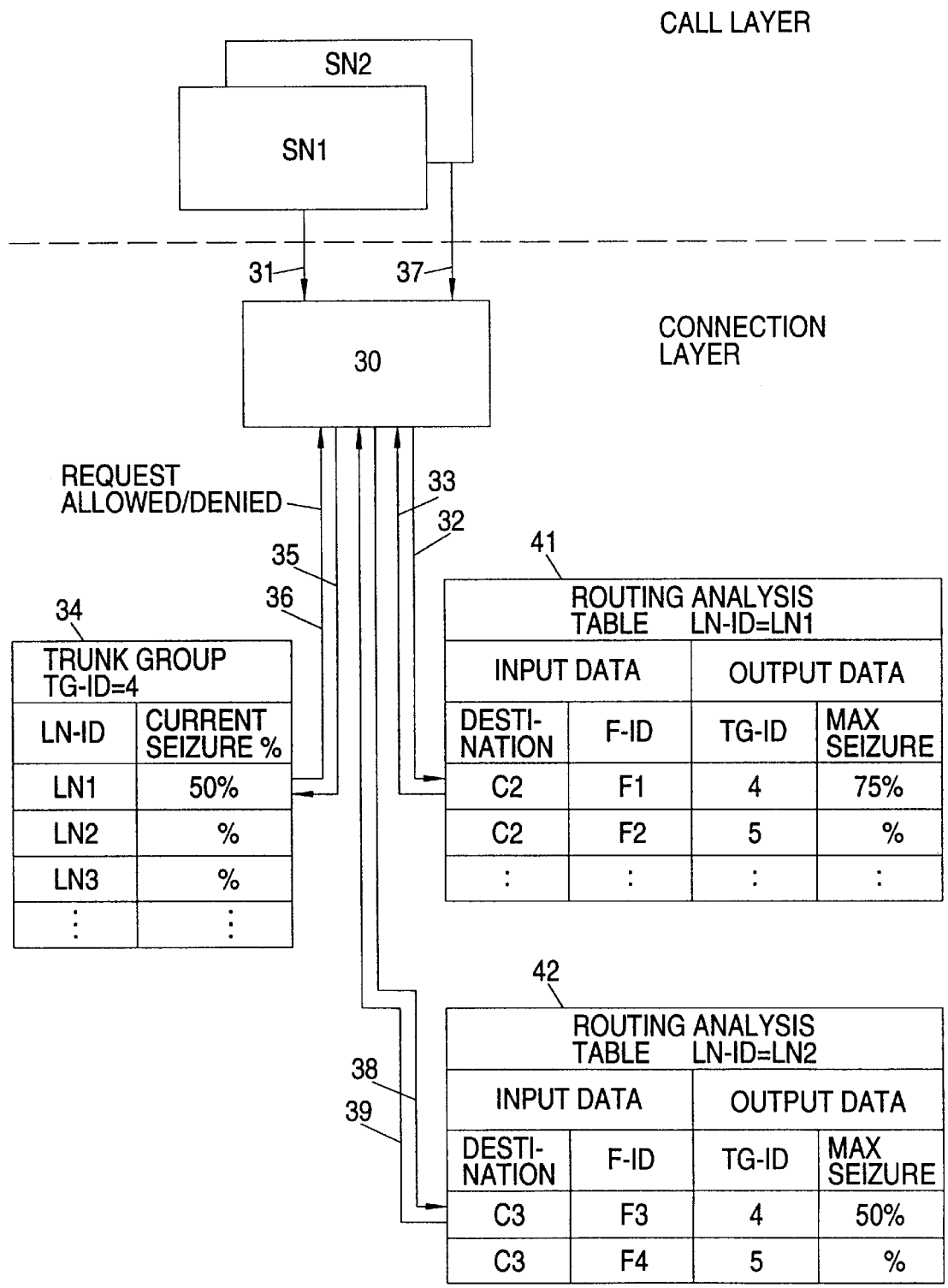
FIG. 5 is similar to FIG. 3 and illustrates a third embodiment of the configuration and resource allocation method in accordance with the invention.

Instead of providing one routing table per fabric and logical network in accordance with FIG. 3 it is possible to use one routing table per logical network and bearer service. Such routing tables for the bearer service STM64 shown at 41 and 42 in FIG. 5. The routing tables 41 and 42 are similar to routing tables 24 and 27 in FIG. 3 and comprises an additional input data column labelled F-ID, fabric identity, which is used to perform routing at fabric level. At an F-ID entry the identity of the fabric in which the routing occurs is indicated. Routing table 41 refers to logical network LN1 and routing table 42 refers to logical network LN2.

Figure 6:
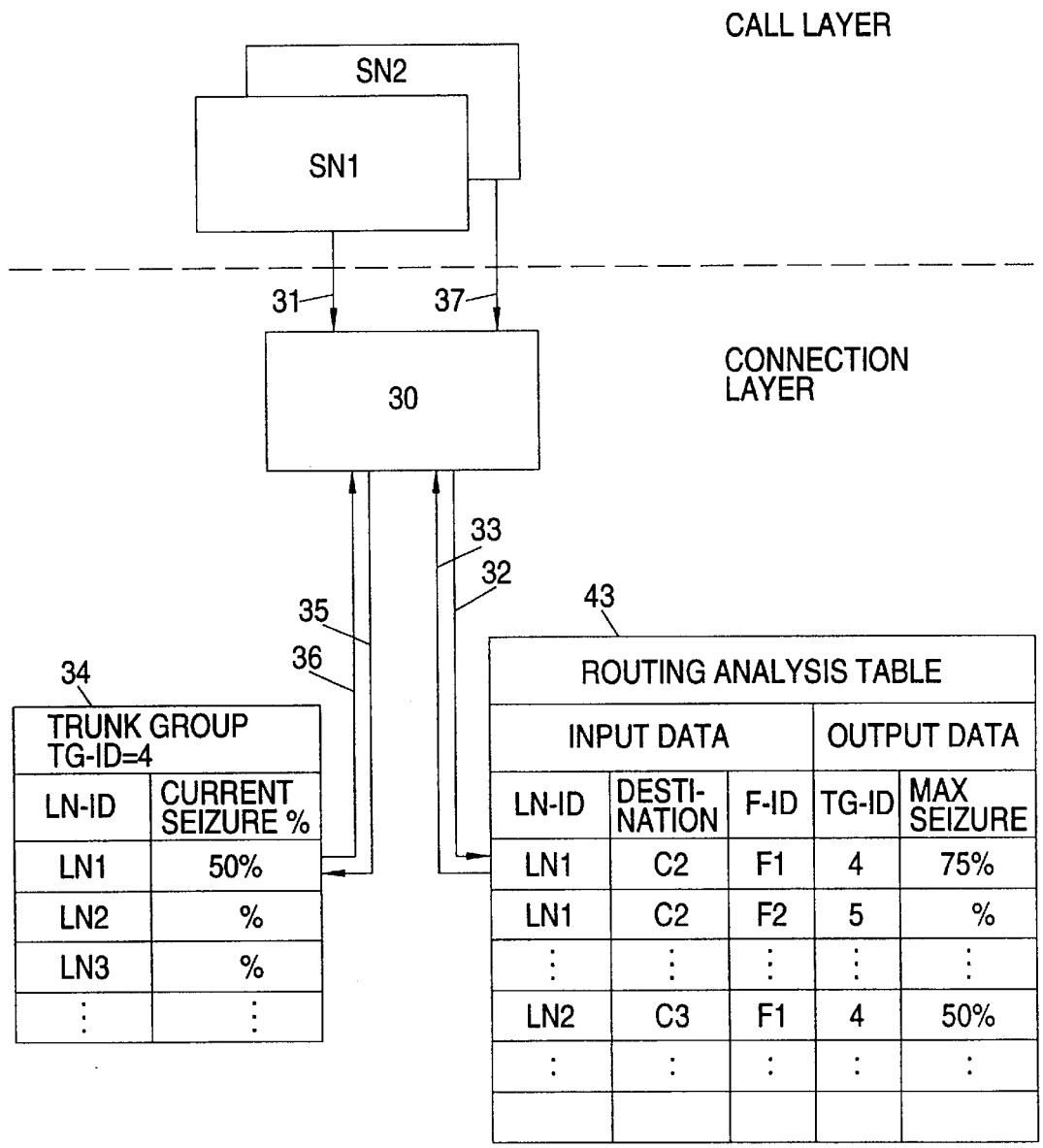
FIG. 6 is similar to FIG. 3 and illustrates still another embodiment of the configuration and allocation method in accordance with the invention.

Still another possibility to design the configuration method and resource allocation method is shown in FIG. 6 wherein one single routing table is used for all the logical networks. This table is shown at 43 and is similar to routing table 40 in FIG. 4. Compared to routing table 40 one additional input data column labelled F-ID which refers to the identity of the fabric in which routing takes place.

If new logical networks are added to the existing physical network the operator needs to add the routing analysis and, if necessary, change the percentage figures relating to the maximum occupancy allowed for the different logical networks.

Should one of the two 2 Mbit/s links go down in FIG. 2 32 channels will be blocked and cannot be used for traffic. Since the channels of the trunk group the identity of which is TG-ID=45 are not dedicated for use by an individual logical network all logical networks engaged in traffic over trunk line 4 will be affected to the same extent. In such a situation the total amount of channels is reduced from 64 to 32 but these remaining 32 channels are available for traffic from the logical networks in accordance with the individual percentage figures indicated in the routing tables. Accordingly traffic can continue in the two logical networks LN1 and LN2, but to a reduced extent.

Accordingly it does not matter whether new resources are added to the system or if resources are taken away from the system; the trunk group having TG-ID=4 is not affected and the traffic can be routed in accordance with the conditions given in the routing tables.

Figure 7:
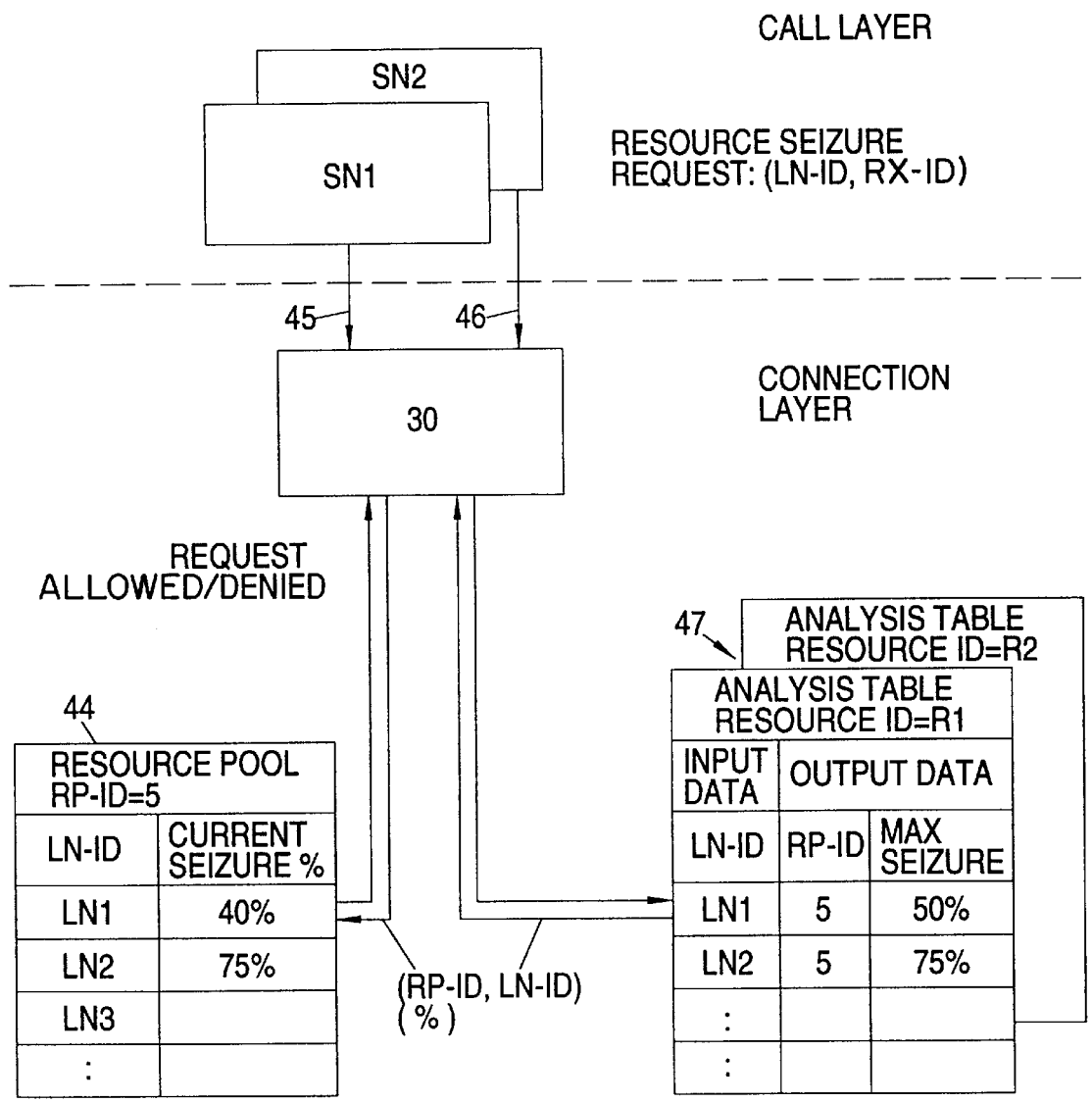
FIG. 7 is a combined flow diagram and block diagram similar to that of FIG. 4 showing a general analysis table used to allocate a resource, e.g. auxiliary devices grouped in a pool, to different logical networks.

In FIG. 7 there is shown a combined block and flow diagram similar to that of FIG. 3 but relating to the allocation of a resource R1 to different logical networks. In particular resource R1, shown in FIG. 2, refers to a pool of a resource which is shared among the switches 1, 2, 3 of the telecommunication network and also shared among the logical networks LN1 and LN2.

Pool R1, may for example comprise expensive facilities such as voice prompting devices. At the connection layer said pool R1 is represented by a pool object 44 shown in FIG. 7. In accordance with the invention the allocation of the voice prompting devices to the different logical networks is controlled by an analyze process similar to that used in routing analysis. Instead of configuring the individual voice prompting devices to the individual logical networks the configuration is made once and for ever in analyze tables similar to the routing tables. The request for seizing a resource, referred to as a seizure request, may accompany or may be triggered by a connection request from any of the service networks as indicated by arrows 45, 46. A seizure request comprises the identity, LN-ID, of the logical network requiring the resource and also the identity, RX-ID, of the resource, in this particular case resource R1. The seizure of a resource follows the same process as that described in connection with FIG. 3 and will therefore not be described in detail. The seizure request is processed by the software package 30 which searches analysis tables 47 to find the table corresponding to resource R1. Once the proper analysis table is found, the entry that corresponds to the logical network identity LN-ID is inspected. Was the seizure request directed to logical network LN1, i.e. LN-ID=LN1 then RP-ID=5 will be returned together with the maximum percentage by which LN1 is allowed to occupy the resources of the identified pool. This output data is next sent to the software package 30 which stores a running index reflecting the number of devices/resources an individual logical network has seized. Before a device is seized by a logical network the software package 30 checks the conditions (a) and (b) above, by comparing the maximum percentage figure with the running index, and accepts or denies the seizure request. In FIG. 7 a request from logical network LN2 will be denied since the current percentage figure is already 75% at the LN2 entry in the resource pool.

Figure 4:
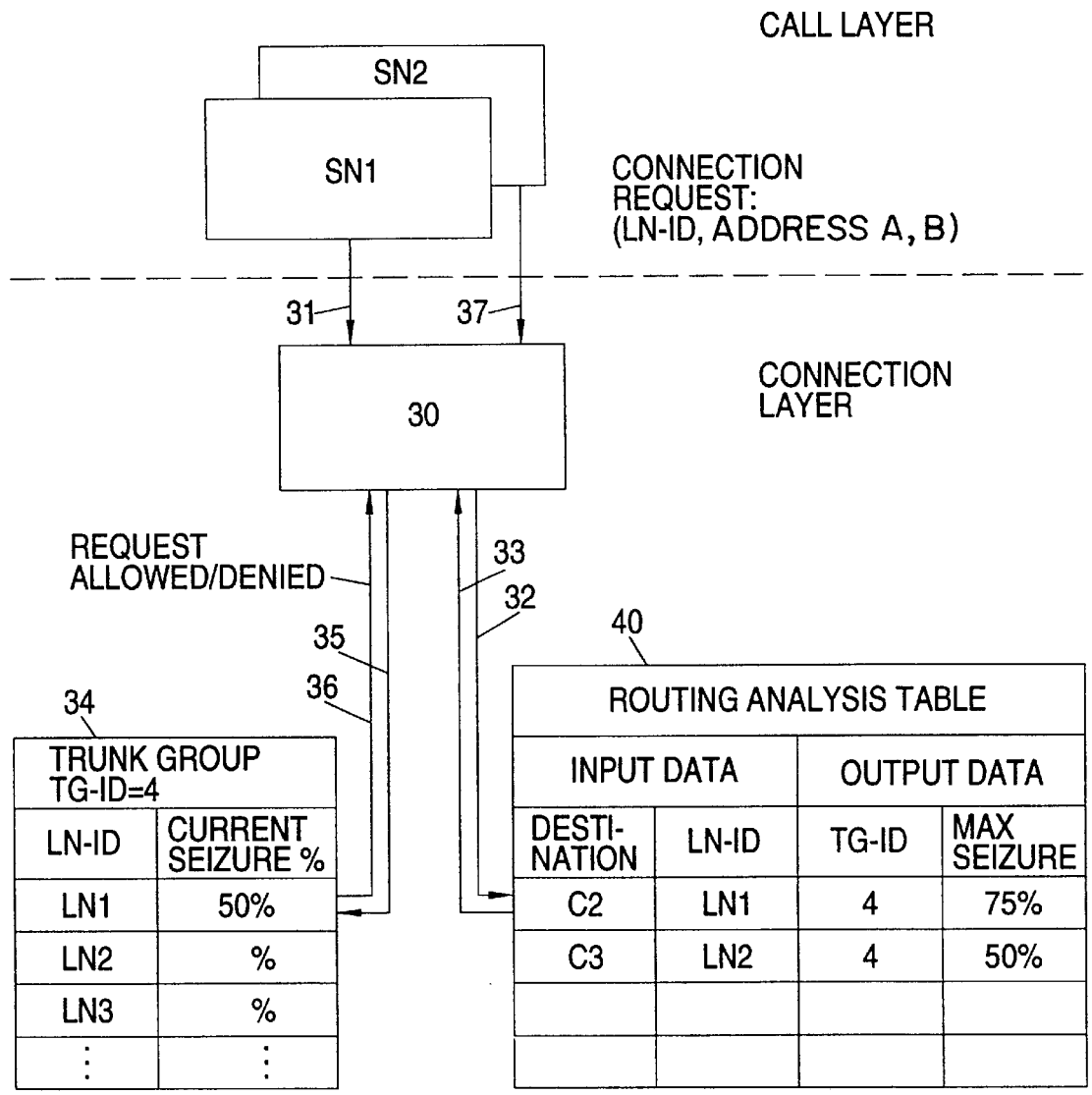
FIG. 4 is similar to FIG. 3 and illustrates a second embodiment of the configuration and resource allocation method in accordance with the invention.
Figure 8:
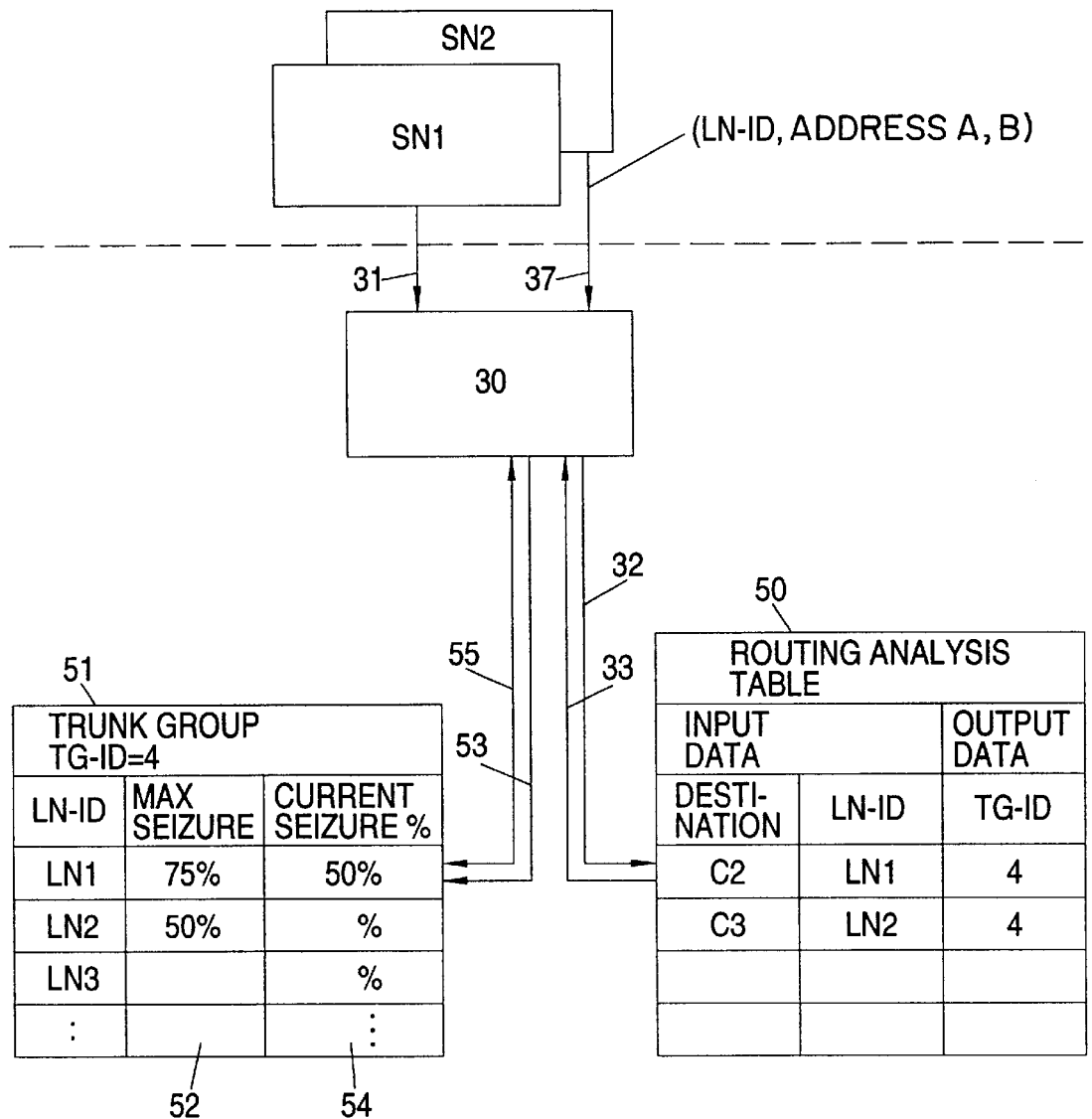
FIG. 8 is a combined flow diagram and block diagram showing still another resource allocation method in accordance with the invention.

FIG. 8 is similar to FIG. 4 and illustrates still another method of allocating resources among different logical networks.

Routing analyses table 50 is common to several logical networks LN1, LN2 and LN3 and comprises a column LN-ID for logical network identifiers. Unlike routing table 40 in FIG. 4 there is no column for maximum degree of occupancy in routing table 50. Instead this column is present in trunk group table 51 as appears at reference designation 52. When a request for the establishment of a connection is received, arrow 31, by the software package 30 routing analyses is initiated, arrow 32, using the destination of the call and the logical network ID as input data. In this case only the identity of the trunk group to be used will be returned. Using the same example as in FIG. 3 input data for the analyses will be C2 and LN1, and as output data TG-ID=4 will be returned, arrow 33. The software package 30 will now operate slightly different compared to the description accompanying FIG. 4. It will use the output data, TG-ID=4, from the routing analyses to search for the corresponding trunk group, arrow 53. Next the software package 30 reads, at the LN1 table entry of the trunk group table 51, the maximum seizure percentage figure and the current seizure percentage figure in columns 52 and 54 respectively. If the current seizure percentage figure at the LN1 table entry is less than the maximum seizure percentage figure (i) a channel of the identified trunk group is seized, provided there is a free channel, (ii) the current seizure percentage figure is updated and (iii) a positive reply to connection request is generated. Double headed arrow 55 represents the information exchange between the software package 30 and the identified trunk group table 51. Conversely, should the current seizure percentage figure at the LN1 table entry be larger than the maximum seizure percentage figure no channel is available to the logical network that requested the connection and accordingly no channel will be seized and the request will be denied.

An imperfection associated with inserting logical network identities and maximum seizure percentage figures in the trunk group tables is that configuration and administration will be adversely affected; should the logical networks change then the routing tables as well as the trunk group tables need to be revised. Such revision at two places opposes one of the main objects of the present invention, namely to centralize all configuration activities to one place, the routing table(s).

Returning now to FIG. 8. Should it be desired to route connections that have the same destination address along one and the same route in all of the logical networks, then the LN-ID column in the routing table 50 can be omitted. This implies that configuration relating to resource allocation is made in the trunk group tables only. The resources of said one and the same route will then be allocated to the logical networks in accordance with the principles of the present invention.

Although the fixed and current seizure figures have been described in terms of percentages of the total amount of a resource they can, within the scope of the present invention, be described in terms of numbers that correspond to said percentage.

We claim:

1. In a call and connection separated network, a method for distributing a resource of a physical network among different logical networks which are using the physical network for establishing connections, said method comprising the steps of:

mapping the resource of the physical network to a corresponding resource in a single network description for said call and connection separated network;

using analysis table means to define one or more logical networks for said call and connection separated network, each logical network including a subset of resources of said single network description;

initially distributing the resource of the physical network among said one or more logical networks by assigning to each logical network a respective portion of the corresponding resource of the single network description, wherein a respective portion initially assigned to an individual logical network is indicative of a maximum extent to which said individual logical network is permitted to seize the corresponding resource; and thereafter dynamically distributing the corresponding resource among said logical networks while ensuring that no individual logical network seizes a portion of the corresponding resource which would exceed a maximum seizure extent defined for said individual logical network with respect to the corresponding resource.

2. A method according to claim 1, wherein said step of dynamically distributing the corresponding resource includes the steps of:

comparing a current extent to which an individual logical network has seized the corresponding resource with a maximum seizure extent defined for said individual logical network with respect to the corresponding resource; and assigning a requested portion of the corresponding resource to said individual logical network in dependence upon a result of said step of comparing.

3. A method according to claim 2, wherein the corresponding resource is associated with a table comprising, for each one of said logical networks, data relating to a maximum seizure extent for the corresponding resource.

4. A method according to claim 3, wherein said initial distribution is made such that each one of the logical networks is guaranteed a minimum amount of the corresponding resource.

5. A method according to claim 3, wherein said initial distribution is made such that said logical networks compete for a portion of the total of the corresponding resource.

6. A method according to claim 3, wherein said initial distribution is made such that there is an open competition between said logical networks for the corresponding resource.

7. A method according to claim 1, wherein said step of dynamically distributing the corresponding resource is conducted in connection with routing analysis.

8. A method according to claim 7, wherein input data to said routing analysis includes a destination of a desired connection, and wherein result/output data of said routing analysis includes an identity of a resource associated with the destination, an identity of a logical network requesting the resource associated with the destination, and a maximum seizure extent defined for said identified logical network with respect to the resource associated with the destination.

9. A method according to claim 8, wherein a comparison of a current seizure extent with a maximum seizure extent is made in the identified resource.

10. A method according to claim 9, wherein said result/output data of said routing analysis is transferred to the identified resource.

* * * * *